(12) United States Patent
Agulnik et al.

(10) Patent No.: US 8,131,858 B2
(45) Date of Patent: Mar. 6, 2012

(54) METHOD AND DEVICES FOR ENABLING A MULTI-MODE DEVICE TO ESTABLISH A SESSION THROUGH MULTIPLE NETWORKS

(75) Inventors: Anatoly Agulnik, Deerfield, IL (US); Rod N. Averbuch, Buffalo Grove, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 258 days.

(21) Appl. No.: 12/062,784

(22) Filed: Apr. 4, 2008

(65) Prior Publication Data
US 2009/0254666 A1    Oct. 8, 2009

(51) Int. Cl.
G06F 15/16    (2006.01)
(52) U.S. Cl. ........................................ 709/227; 709/228
(58) Field of Classification Search .......... 709/223–224, 709/227–229, 239, 245; 455/436; 370/355–360, 370/464–469
See application file for complete search history.

(56) References Cited

U.S. PATENT DOCUMENTS

| | | | | |
|---|---|---|---|---|
| 5,951,650 | A * | 9/1999 | Bell et al. ...................... | 709/238 |
| 7,162,236 | B2 | 1/2007 | Dorenbosch | |
| 2002/0093981 | A1* | 7/2002 | Turina et al. ................... | 370/467 |
| 2002/0107019 | A1* | 8/2002 | Mikola et al. .................. | 455/436 |
| 2002/0119821 | A1* | 8/2002 | Sen et al. ......................... | 463/42 |
| 2004/0028009 | A1* | 2/2004 | Dorenbosch et al. ........ | 370/329 |
| 2005/0213518 | A1* | 9/2005 | Ahya et al. ..................... | 370/276 |
| 2006/0031368 | A1* | 2/2006 | deCone .......................... | 709/207 |
| 2006/0193295 | A1* | 8/2006 | White et al. ................... | 370/336 |
| 2006/0234744 | A1 | 10/2006 | Sung | |
| 2007/0038758 | A1* | 2/2007 | Mu et al. ........................ | 709/227 |
| 2007/0140161 | A1 | 6/2007 | Silverman | |
| 2007/0291786 | A1* | 12/2007 | Maes .............................. | 370/465 |
| 2009/0047915 | A1* | 2/2009 | Albertsson .................... | 455/90.2 |
| 2009/0274068 | A1* | 11/2009 | Kostner et al. ................ | 370/255 |

FOREIGN PATENT DOCUMENTS

| | | | |
|---|---|---|---|
| WO | WO2004054302 | A | 6/2004 |
| WO | WO2007107185 | A | 9/2007 |

OTHER PUBLICATIONS

J. Rosenberg, H. Schulzrinne, G. Camarillo, A. R. Johnston, J. Peterson, R. Sparks, M. Handley, and E. Schooler. SIP: session initiation protocol. RFC 3261, IETF, Jun. 2002.*
"register." Merriam-Webster Online Dictionary. 2010.Merriam-Webster Online. May 21, 2010 <http://www.merriam-webster.com/dictionary/register>.*
PCT Search Report Dated May 14, 2009.
Open Mobile Alliance Ltd, "Push to Talk Over Cellular 2 Requirements" Candidate Version 2.0, Oct. 2, 2007, OMA-RD-POC-V2_0-20071002-C.

* cited by examiner

*Primary Examiner* — Brendan Higa
(74) *Attorney, Agent, or Firm* — Valerie M. Davis; Kenneth A. Haas (57) ABSTRACT

A method, device, and computer-readable storage element enables a multi-mode device to establish a session through multiple networks in a communication system. The method includes registering, at the same time, each of a plurality of sub-clients of a single multi-mode device with a single application server, wherein each sub-client is separately registered through a different network, using an individual logical identity. The method further includes detecting an invitation including session parameters to establish a session using the single application server, and selecting at least one of the sub-clients to process the invitation based on the session parameters to establish the session through the networks corresponding to the selected sub-client.

16 Claims, 7 Drawing Sheets

METHOD AND DEVICES FOR ENABLING A MULTI-MODE DEVICE TO ESTABLISH A SESSION THROUGH MULTIPLE NETWORKS

FIELD OF THE DISCLOSURE

The present disclosure relates generally to multi-mode devices and more particularly to enabling multi-mode devices to establish a session through multiple networks in a communication system.

BACKGROUND

In recent years, various types of communication networks have been developed to transmit different types of communication related content, e.g., voice, data, video. Presently, some communication systems use only a single network to stream the different types of communication related content despite that the network may not be optimized for a particular content stream.

Various other communication systems employ the use of a plurality of devices by a single user, wherein each device may access a different communication network. These devices are configured to communicate with each other via some transport layer protocol to receive a service and/or communication related content. However, a shortcoming of this type of communication system is that it requires the user to purchase and carry multiple devices to access the different networks, which can be costly and cumbersome.

Also known is the use of a multi-mode device, which allows the user to carry a single device that can communicate via multiple networks. However, such a device registers to a specific application server as a single logical and physical entity at a time, but with different contact addresses on each of the multiple networks. Such a registration reduces the flexibility and control of the multi-mode device in accessing the application server. Such a registration also requires additional functionality in the application server since a standard server's functionality limits the benefits that known multi-mode devices can achieve through having multiple different network connections with the application server. Also, some known multi-mode devices require a special multi-networking support protocol (e.g., Stream Control Transport Protocol (SCTP)) to perform multi-network switching. All participants (including the application servers) must support this additional SCTP protocol on top of their existing protocol stack. Usage of this additional protocol causes an additional overhead that reduces overall performance while increasing complexity and cost of the multi-mode devices and of the overall communication system.

Thus, there exists a need for a method, multi-mode device and computer-readable storage element to establish a session through multiple networks in a communication system, which addresses at least some of the shortcomings of past and present communication devices and techniques.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention. In addition, the description and drawings do not necessarily require the order illustrated.

The apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, pursuant to the various embodiments, a method, device, and computer-readable storage element enables a multi-mode device to establish a session through multiple networks in a communication system. The method includes registering each of a plurality of sub-clients of a single multi-mode device with a single application server, where each sub-client is registered at the same time with the server using an individual logical identity through a different network. The method further includes detecting an invitation including session parameters to establish a session using the single application server, and selecting at least one of the sub-clients to process the invitation based on the session parameters to establish the session through the networks corresponding to the selected sub-clients. Advantages of the various embodiments include: use of standard Session Initiation Protocol to implement embodiments; no additional special protocol use required in the multi-mode device or the application server, which reduces the complexity and cost of the devices and the communication system; an increase in flexibility in the multi-mode device's utilization of the multiple networks for content transfer. Those skilled in the art will realize that the above recognized advantages and other advantages described herein are merely illustrative and are not meant to be a complete rendering of all of the advantages of the various embodiments.

Figure 1:
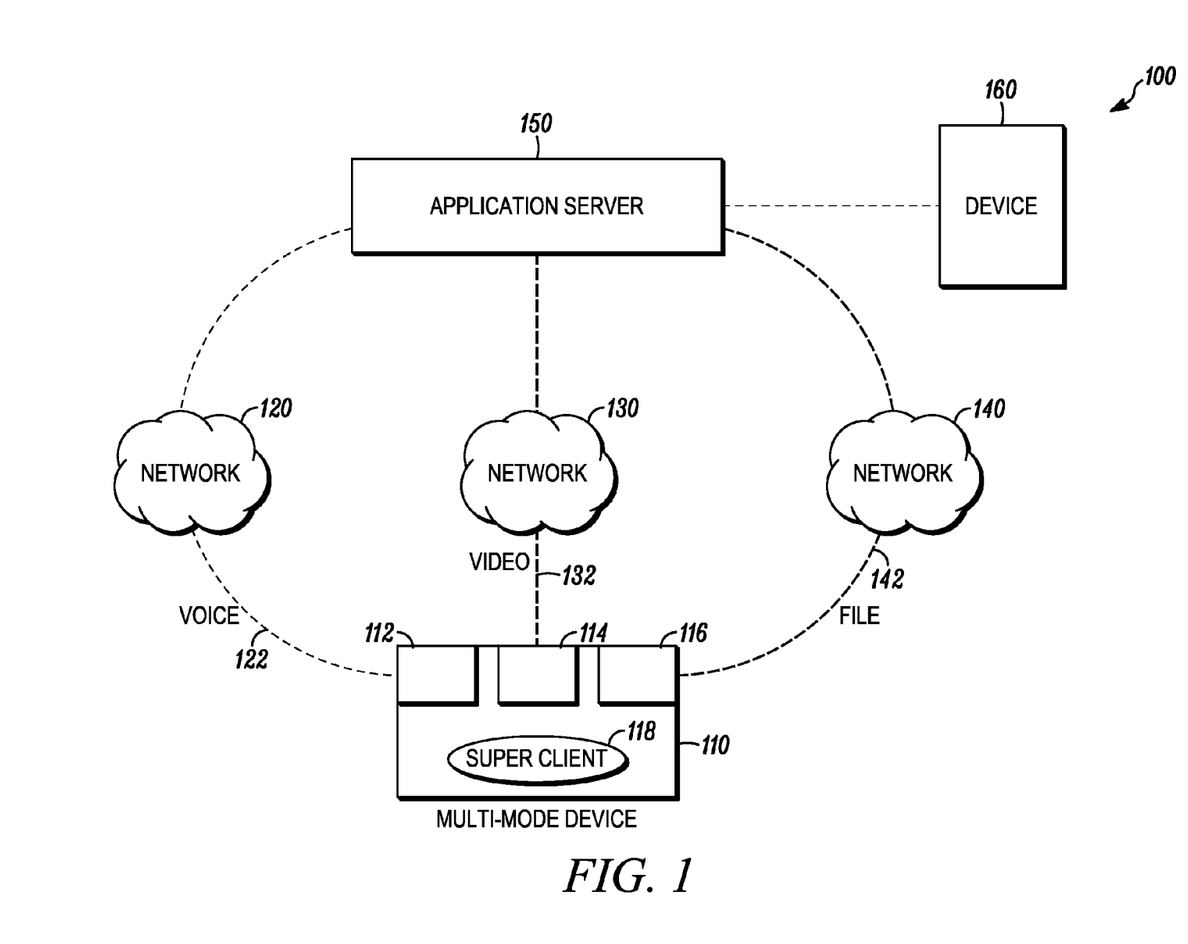
FIG. 1 is a block diagram of a communication system in accordance with some embodiments.

Referring now to the figures, FIG. 1 is a block diagram of a communication system 100 in accordance with some embodiments. The communication system 100 comprises a multi-mode device 110, multiple networks 120, 130, 140, and an application server 150. The multi-mode device 110 is capable of monitoring and connecting to multiple networks 120, 130, 140 simultaneously. Multiple networks 120, 130, 140 may include, but are not limited to, second generation (2G) networks such as Global System for Mobile communication (GSM), General Packet Radio Service (GPRS), Enhanced Data rates for GSM Evolution (EDGE), Integrated Digital Enhanced Network (iDEN); third generation (3G) networks such as Universal Mobile Telecommunications System (UMTS), High-Speed Data Access (HSPA), Code Division Multiple Access (CDMA), Wideband CDMA (W-CDMA); and fourth generation (4G) networks such as Worldwide Interoperability for Microwave Access (WiMAX). Networks 120, 130, 140 may be either homogeneous, i.e., all the same kind of networks or heterogeneous, i.e., wherein at least two of the networks are different kinds of networks. The differences between two heterogeneous networks may include, for example, that the networks: are different kinds of radio access networks (e.g., GSM versus UMTS), which use different radio access technologies; use different air interface protocols; have different network topologies, e.g., one network has a Internet Protocol (IP) Multimedia Subsystem (IMS) framework while another network is non-IMS based, to name a few.

Moreover, in accordance with some embodiments, the communication system 100 may be implemented using versions of Push-to-Talk (PTT) based on 2.5G or 3G networks and using an "application-layer protocol", which works in the application layer of the Open Systems Interconnection (OSI) communication model to provide services to an application running on a device. Examples of application-layer protocols that can be used with PTT are Session Initiation Protocol (SIP) as specified in Internet Engineering Task Force (IETF) Request for Comments (RFC) 3261 (Rosenberg, et al. 2002, including previous and subsequent revisions) and Real-time Transport Protocol (RTP) as specified in IETF RFC 3550, 3551 and 3711 (respectively, Schulzrinne, et al. July 2003, Schulzrinne, et al. July 2003, and Baugher, et al. March 2004, each RFC including previous and subsequent revisions), for creating, modifying and terminating sessions with one or more devices. PTT can be used to create two-party, multiparty (group), or multicast sessions that include simple file transfers, Internet telephone calls, multimedia distribution, and multimedia conferences. One particular version of PTT is called Push to Talk over Cellular, which is abbreviated as PoC. One such example of PoC is described in a document published by Open Media Alliance and titled "Push to talk over Cellular 2" (Candidate Version 2.0—Oct. 2, 2007), including previous and subsequent revisions.

The multi-mode device 110 comprises a single physical housing that includes a plurality of sub-clients 112, 114, 116 and a super client 118. In accordance with one embodiment, each of the sub-clients 112, 114, and 116 is associated with a different hardware module (e.g., modem and/or transceiver) within the multi-mode device 110. In another embodiment, each of the sub-clients 112, 114, and 116 is represented as a different software module (e.g., as in a software definable radio), within the multi-mode device 110. The functionalities of the sub-clients 112, 114, and 116 are controlled and coordinated by the super client 118. For example, the super client 118 enables the multi-mode device to establish communication sessions (e.g., for content transfer) through the multiple networks 120, 130, and 140, as described in detail below by reference to FIGS. 3-7. In doing this, the super client 118 represents the sub-clients 112, 114, and 116 as a single entity to a user of the multi-mode device 110. However, an aspect of the embodiments disclosed herein that enables greater flexibility in the multi-mode device's use of the multiple networks is that each of the sub-clients 112, 114, and 116 is registered with (and thus appears to) the application server 150 as a different device, as explained in detail below.

Although the multi-mode device 110 shows three sub-clients 112, 114, 116, it will be apparent to a person of ordinary skill in the art that any number of sub-clients may be included in the multi-mode device.

The application server 150 can be any suitable application server, including one that uses known protocols and has no enhanced functionality. The application server 150 controls maintenance and management of a session for the multi-mode device 110. Moreover, in one illustrative implementation, the application server 150 controls maintenance and management of a session between the multi-mode device 110 and one or more other devices, with one such other device being illustrated in FIG. 1 as a device 160.

Each of the sub-clients 112, 114, 116 registers with the application server 150 through a different one of the multiple networks 120, 130, 140 during any given time frame. Accordingly, any one, any combination of, or all of the sub-clients can be simultaneously registered with the application server during any given time frame. However, if multiple sub-clients are registered with the server at the same time, they are registered through a different network. In one example, as shown in FIG. 1, the sub-client 112 is (as indicated by the dashed line) registered with the application server 150 through the network 120, which is capable of supporting voice streaming 122. The sub-client 114 is registered with the application server 150 through the network 130, which is capable of supporting video streaming 132, and the sub-client 116 is registered with the application server 150 through the network 140, which is capable of supporting file transfers 142.

Each sub-client 112, 114, 116 is registered at the same time with the application server 150 using an individual logical identity through a different network, such as networks 120, 130, 140. Usually, but not necessarily, a different individual logical identity is used for each of the sub-clients. The individual logical identity may, for example, be an individual Uniform Resource Identifier (iURI) that is recognizable by the networks 120, 130, 140 and the application server 150 (e.g., SIP URI messaging for a SIP IP core network). In accordance with some embodiments, the sub-client 112, 114, or 116 registers its individual logical identity with the application server 150 to get associated with a specific network of the networks 120, 130, and 140 using a physical contact address on the specific network. Therefore, each of the sub-clients 112, 114, and 116 may register using different individual logical identities, thereby providing a 1:1 mapping between the sub-client and the individual logical identity and, thereby, appearing as different devices to the application server. In accordance with some embodiments, the individual logical identities of the sub-clients 112, 114, and 116 are pre-configured in the application server 150. Also, the individual logical identity of each sub-client 112, 114, and 116 may be pre-configured with its corresponding network.

In another implementation, at least one of the sub-clients also (or alternatively) registers with the application server using a public identity, also referred to herein as a shared logical identity. When the server supports certain functionality (e.g., processing of a Partial 200 OK message) all of the sub-clients register with the application server using the same public identity, which is common to the plurality of sub-clients. As a result, the public identity of the multi-mode device 110 is associated with several sub-clients and their individual logical identities. The public identity may be a shared Uniform Resource Identifier (sURI).

As used herein, sub-clients registering or being registered "at the same time" means that during some given time frame, multiple sub-clients simultaneously have an active registration with the application server via a network to enable the application server to establish a communication session with the sub-clients. Registering "at the same time" does not necessarily mean that the registration process is simultaneously performed for the multiple sub-clients, although this is not excluded from the teachings herein. Moreover, an active registration is independent of whether a communication session has been established between a sub-client and a server. However, the active registration requires at least one of the sub-clients 112, 114, and 116 to register with the application server 150 through one of the networks 120, 130, and 140. The registration procedure can be based on a Session Initiation Protocol (SIP) registration procedure for a SIP IP Core network or IMS registration protocol for IMS based IP Core network, for example.

Figure 2:
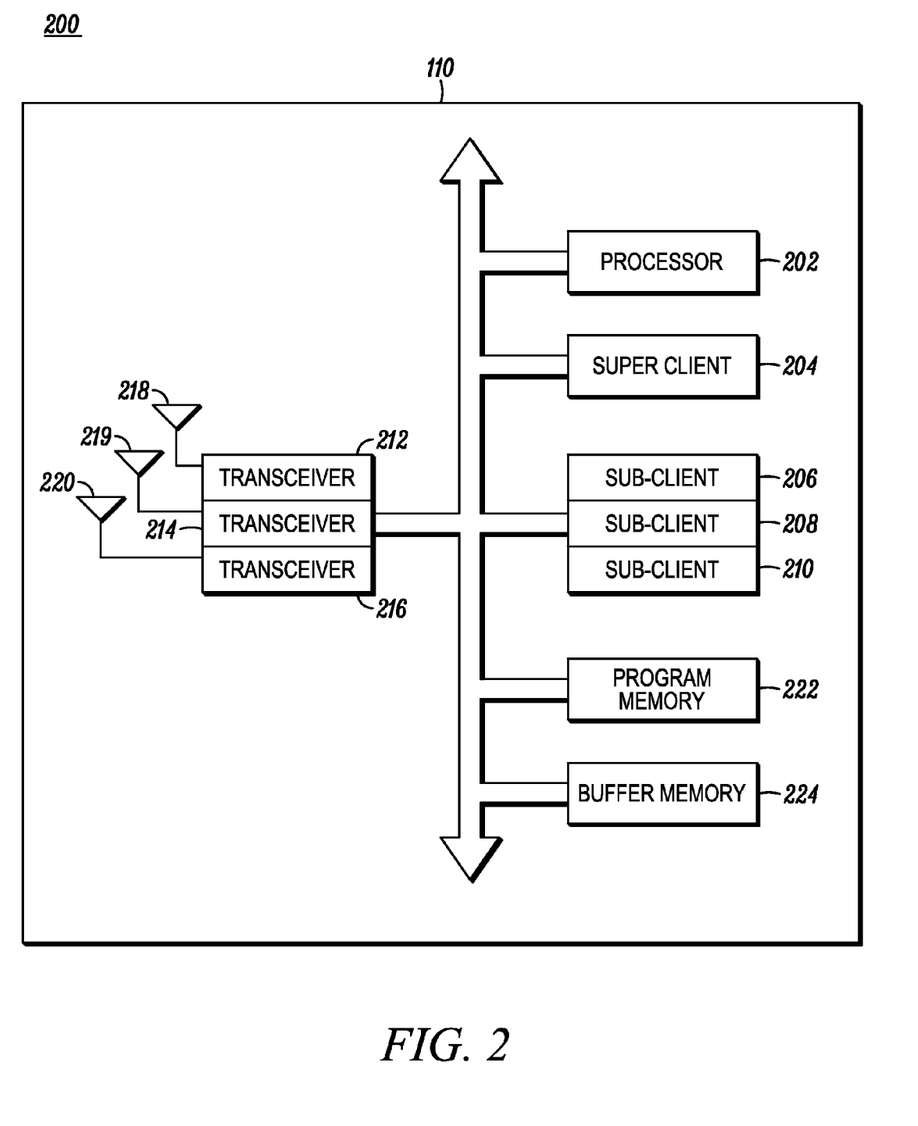
FIG. 2 is a block diagram of a multi-mode device in accordance with some embodiments.

FIG. 2 is a block diagram 200 of the multi-mode device 110 in accordance with some embodiments. The multi-mode device 110 comprises a processor (or processing device) 202, a super client 204, a plurality of sub-clients 206, 208, 210, a plurality of transceivers 212, 214, 216 attached, respectively, to antennas 218, 219, 220, a program memory 222, and a buffer memory 224. Although not shown, the multi-mode device 110 can also include an antenna switch, duplexer, circulator, or other highly isolative means for providing information streams associated with a session from a transmitter circuitry of the transceiver 212, 214, 216, to the antenna 218, 219, 220, and from the antenna 218, 219, 220, to a receiver circuitry of the transceiver 212, 214, 216. The multi-mode device 110 is an integrated unit containing at least all the elements depicted in FIG. 2, as well as any other elements necessary for the multi-mode device 110 to perform its particular electronic function. Alternatively, the multi-mode device 110 can comprise a collection of appropriately interconnected units or devices housed within the same physical unit 110, wherein such units or devices perform functions that are equivalent to the functions performed by the above-described elements of the multi-mode device 110. The multi-mode device 110 may be any type of wireless communication device including, but not limited to, cellular, mobile, and wireless telephones; PCs (personal computers), laptops, notebooks, and wearable computers with wireless modems, PDAs (personal digital assistants) with wireless modems; and pagers.

The processor 202 includes one or more microprocessors, microcontrollers, DSPs (digital signal processors), state machines, logic circuitry, or any other device or devices that process information based on operational or programming instructions. Such operational or programming instructions are stored in the program memory 222. The program memory 222 can be an IC (integrated circuit) memory chip containing any form of RAM (random-access memory) or ROM (read-only memory), a floppy disk, a CD-ROM (compact disk read-only memory), a hard disk drive, a DVD (digital video disc), a flash memory card, external subscriber identity module (SIM) card or any other medium for storing digital information. One of ordinary skill in the art will recognize that when the processor 202 has one or more of its functions performed by a state machine or logic circuitry, the program memory 222 containing the corresponding operational instructions can be embedded within the state machine or logic circuitry.

The super client 204 enables the multi-mode device 110 to establish a session through multiple networks 120, 130, 140 in the communication system 100. Specifically, the super client 204 controls and coordinates the registration of one or more of the sub-clients 206, 208, 210 with the application server 150 and the establishment of the session between at least one of the registered sub-clients 206, 208, 210 and the application server 150. The super client 204 also selects at least one of the sub-clients 206, 208, 210 to accept or send an invitation for the session. The invitation is received from or sent to the application server 150 via one of the transceivers 212, 214, 216 and includes session parameters for the session. Examples of session parameters include, but are not limited to: calling party, the number of media streams in the session, type of media for each media stream, and for each media stream, specific parameters such as, for instance, bandwidth, bit rate, codec, and the like.

The selected sub-clients then establish the session with the application server 150 through the corresponding multiple networks. Since the multi-mode device 110 can participate in the same session through different networks accessible via different sub-clients of the multi-mode device 110, different media streams of the same session can be delivered to the multi-mode device 110 simultaneously through the different networks 120, 130, 140. Examples of media streams include, but are not limited to, voice, video, image, and text. In one example, the functions of the super client 204 are implemented in a processor, such as the processor 202, or may be implemented in a custom designed hardware or a combination of software and hardware.

The transceivers 212, 214, 216 are capable of operating in multiple frequency bands enabling the multi-mode device 110 to monitor and connect to different networks 120, 130, 140 simultaneously. In one example, the transceivers 212, 214, 216 are designed to operate over a cellular air interface (e.g., Global System for Mobile communication (GSM), Code Division Multiple Access (CDMA), Wide-band CDMA (WCDMA), Universal Mobile Telecommunications System (UMTS), and the like), an ad hoc networking air interface (e.g., BLUETOOTH, 802.11 WLAN (wireless local area network), 802.16 WiMax, and the like), etc. In one example, each sub-client 206, 208, 210 is coupled to at least one of the transceivers 212, 214, 216, thereby enabling the sub-clients 206, 208, 210 to register with the application server 150 through multiple networks 120, 130, 140. In one example, the sub-clients 206, 208, 210 may be implemented as part of the transceivers 212, 214, 216.

The implementations of the transceivers 212, 214, 216 depend on the implementation of the multi-mode device 110. For example, the transceivers 212, 214, 216 can be implemented as an appropriate wireless modem, or as conventional transmitting and receiving components of two-way wireless communication devices. In the event that the transceivers 212, 214, 216 are implemented as a wireless modem, the modem can be internal to the multi-mode device 110 or insertable into the multi-mode device 110 (e.g., embodied in a wireless radio frequency (RF) modem implemented on a Personal Computer Memory Card International Association (PCMCIA) card). For a wireless communication device, the transceivers can be implemented as part of the wireless device hardware and software architecture in accordance with known techniques. Most, if not all, of the functions of the transceivers can be implemented in a processor, such as the processor 202. However, the processor 202, and the transceivers 212, 214, 216 have been artificially partitioned herein to facilitate a better understanding.

Moreover, the antennas 218, 219, 220 comprise any known or developed structure for radiating and receiving electromagnetic energy in the frequency range containing the wireless carrier frequencies. The buffer memory 224 can be any form of volatile memory, such as random access memory (RAM), and is used for temporarily storing received information streams in accordance with some embodiments.

FIG. 2 illustrates one specific embodiment of a multi-mode device. However, other embodiments of multi-mode devices are contemplated within the scope of the present teachings. For example, in another embodiment, the multi-mode device comprises a software defined radio that eliminates the need for multiple transceivers and antennas. The software defined radio can comprise a single transceiver and antenna that simultaneously connects the sub-clients 206, 208, 210 to the multiple networks 120, 130, 140.

More particularly, multiple communication configurations are stored in the multi-mode device. Although only one configuration is generally active at a particular time, the single hardware device can simultaneously maintain multiple connections or channels by using handshaking, sleep modes, error tolerance properties, or other features of selected protocols, and switch between configurations associated with the simultaneously maintained connections at a rate sufficient to keep all connections active. In this way, applications using the single hardware device may behave as though they have complete control of it—not only of information or paths, as is typical in modern operating systems, but over the configured properties of the device. A scheduling algorithm generally controls which of the configurations is active at a given time.

This embodiment of multi-mode device contains a hardware peripheral that includes the transceiver and antenna, which is capable of supporting multiple communication configurations stored on the device, wherein a communication configuration is characterized by software applications and data required to program the peripheral to communicate on a given network using a given communication protocol. The configuration data may comprise data related to, for example, modulation, rate, transmission power, channel, filter requirements, etc. The communication configurations further comprise (e.g., within the peripheral) logical information or data paths coupled between the peripheral and applications stored on the multi-mode device and that support the various communication configurations. In one embodiment, for example, each data path and corresponding application is implemented as one or more layers of a protocol stack in accordance with the well known Open Systems Interconnect (OSI) model for processing the information transmitted from and received to the multi-mode device using, for example, processor 202. In other embodiments, each corresponding application and data path may comprise a medium access control (MAC) engine (for instance in accordance with the well known 802.11 WLAN protocol), a driver, a user application, or any other entity capable of utilizing the peripheral.

The peripheral further comprises a configuration controller that selects which communication configuration is active at any time and arbitrates the switching of the hardware from one configuration to another as needed. In an embodiment, the configuration controller includes a hardware portion referred to herein as the "controller" and a software portion referred to herein as the "scheduler." The controller physically selects or switches to a given configuration block for configuring the multi-mode device during a predetermined or prearranged time frame and further physically selects or switches to the corresponding data path associated with the selected configuration block. The scheduler programs the controller to select certain communication configurations and data paths at prearranged times. This arrangement allows the scheduler to manage the multiple connections to respective networks, and enables these connections to be simultaneously maintained with the multi-mode device being present on each connection for only a fraction of the time. The scheduler can be said to comprise a single hardware abstraction layer (HAL) servicing multiple communication configurations by being an interface between applications and the peripheral so that applications can perform their functions asynchronously while the peripheral operates in real time to receive and transmit information over the networks.

To enable its functionality, the scheduler generally has some awareness of the protocols being used on the networks in order to arrange and interpret the times (e.g., time frames) that device presence on each connection is required or optional. Thus, the scheduler uses its knowledge of one or more parameters of the protocols associated with connections to determine and program the controller with configuration scheduling for the multi-mode device. The scheduling may be determined using any suitable scheduling algorithm.

Figure 3:
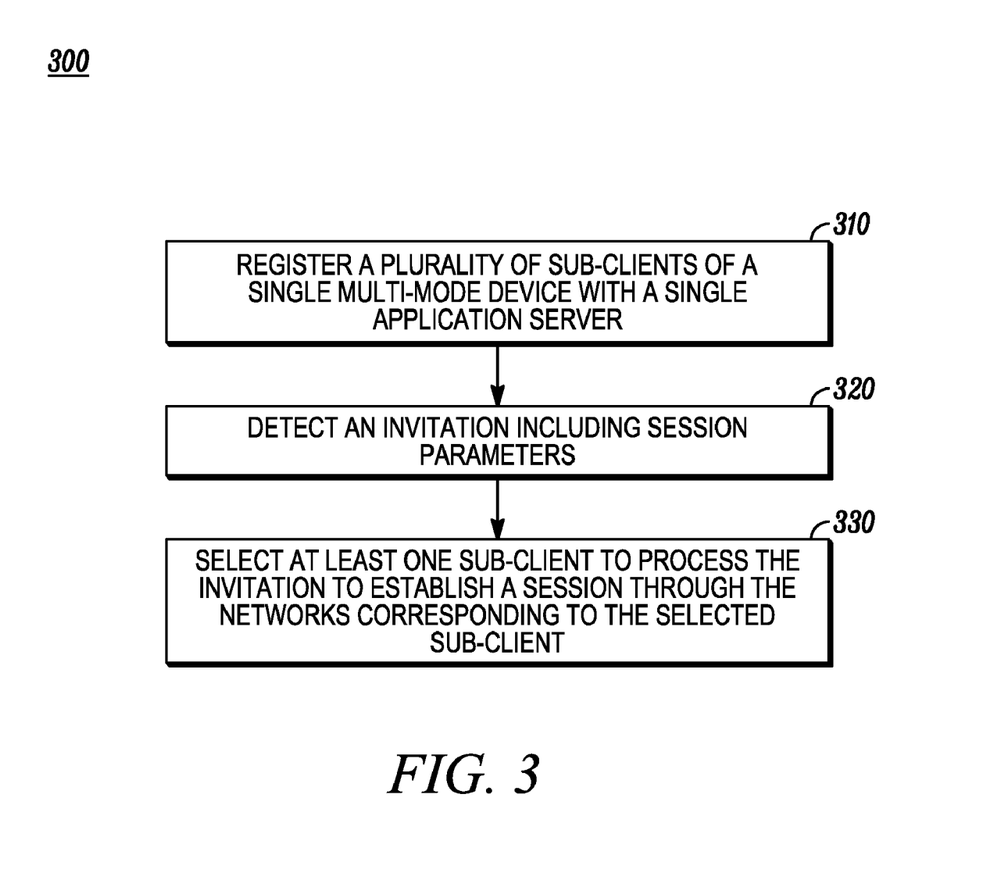
FIG. 3 is a flow diagram of a method in accordance with some embodiments.

FIG. 3 is a flow diagram of a method 300 in accordance with some embodiments. Method 300 enables a multi-mode device, such as the multi-mode device 110, to establish a session through multiple networks in a communication system. The method includes registering (310) each of a plurality of sub-clients of a single multi-mode device with a single application server, such as application server 150, wherein each sub-client is registered using an individual logical identity at the same time through a different network. The method 300 further includes detecting (320) an invitation including session parameters to establish a session using the single application server, and selecting (330) at least one of the plurality of sub-clients to process the invitation, based on the session parameters, to establish the session through the networks corresponding to the selected sub-clients. The detecting of the invitation may be due to the multi-mode device directing certain ones of the sub-clients to send the invitation to the server or to another device or due to the sub-clients receiving the invitation from the server or another device. How the invitation is processed depends on whether the invitation is being sent or received by the multi-mode device. Detailed illustrative implementations of method 300 are next described by reference to FIGS. 4 through 7.

Figure 4:
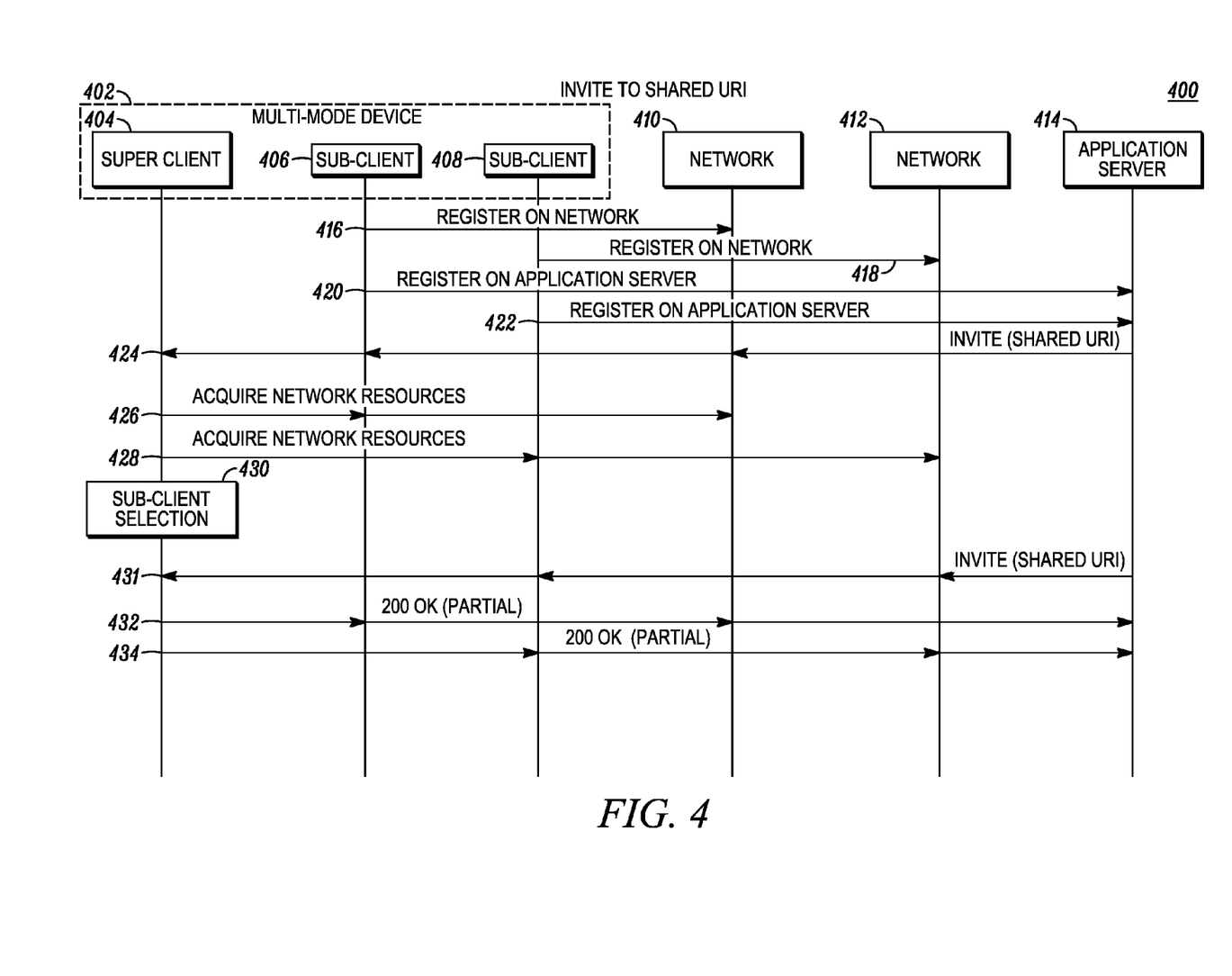
FIG. 4 is signal flow diagram in accordance with some embodiments.

Referring now to FIG. 4, a call flow diagram 400 illustrating operation of the system 100 in accordance with some embodiments is shown. Generally speaking, the call flow 400 is a specific illustrative approach for establishing a session followed by steps resulting in media streaming through various multiple networks. Moreover, the order of the signaling within each flow diagram does not necessarily denote order and timing of the signaling unless specifically indicated.

In the present implementation, shown in FIG. 4 is a multi-mode device 402, comprising: a super client 404, a sub-client 406, and a sub-client 408. Further illustrated are a network 410, a network 412, and an application server 414. Sub-clients 406, 408 register with their corresponding networks 410, 412, respectively, at 416 and 418, wherein for instance each sub-client registers with an appropriate entity in the network responsible for routing. Operationally, the sub-client 406 transmits its registration details to network 410, and the sub-client 408 transmits its registration details to network 412. In this particular implementation, the registration details are sent using SIP messaging, for example a SIP REGISTER message including "Register on network" (416) for sub-client 406 and "Register on network" (418) for sub-client 408, although other registration techniques may be used without departing from the scope of the disclosure herein. In one example, the registration details include, but are not limited to, the individual logical identity for a particular sub-client. In this illustrative implementation, the registration details further include a shared logical identity, e.g., a sURI, shared in common between all of the sub-clients.

Further, sub-client 406 and sub-client 408 individually register with the application server 414 using their corresponding individual logical identities, respectively, at 420 and 422 and using the shared logical identity. During registration with the application server 414, the sub-client 406 transmits its registration details (420) to the application server 414, and the sub-client 408 transmits its registration details (422) to the application server 414, which include, but are not limited to, the individual logical identity and the shared logical identity. The registration with the application server can also provide some information to the multi-mode device of capabilities of the application server, e.g., relevant protocols used by the application server that can indicate to the multi-mode device whether the application server supports certain functions (e.g., a partial 200 OK (also shown in FIG. 4 as a 200 OK (partial)), which is SIP OK message that acknowledges acceptance of a subset of the content streams indicated in the corresponding SIP INVITE). The registration of the sub-client 406 and the sub-client 408 with the application server 414 may also be performed based on a SIP enabled message.

The registration details transmitted by sub-client 406 and sub-client 408 to register with the networks 410 and 412, and with the application server 414, may take many forms but are at least sufficient to identify a relevant sub-client and an application service and portions thereof. For example, in a SIP controlled session, the registration details are at least sufficient to identify the individual logical identity, the shared logical identity (when used), and the routing information required by the application server 414 to be able to communicate with the registering sub-client. It should be noted that in this illustrative implementation all of the sub-clients of the multi-mode device are registered at the same time with the application server and with their respective networks, and all of the sub-clients register the shared logical identity with the application server. However, in other implementations, only a subset (one or more) of the total number of sub-clients may be registered with the application server and the network(s) at a given point in time, and only a subset may register the shared logical identity with the application server.

In the call flow shown in FIG. 4, the application server 414 initiates an establishment of a session with the multi-mode device 402 by sending to sub-clients 406 and 408, respectively, SIP INVITEs (424) and (431) to the shared URI. The INVITEs includes session parameters related to the session. In one example, the session parameters comprise at least one of a session description, a time description, or a media description. The session description can include information related to at least a session identification, protocol version, owner or creator, email address, phone number, time zone adjustments, encryption key, or bandwidth information. The time description can include information related to at least an amount of time the session is to be active. The media description can include information related to at least a media type or a media format. In one example, the session parameters are described based on Session Description Protocol (SDP) as specified in IETF RFC 4566 (including previous and subsequent revisions), which is a protocol that is used for describing multimedia sessions for the purpose of session announcement, session invitation, and other forms of multimedia session invitation.

As further illustrated by FIG. 4, the super client 404 receives the SIP INVITE (424) first in time via sub-client 406 (before the SIP INVITE (431)) and determines (430), based at least on the session parameters included in the SIP INVITE (424), whether one or both of the sub-clients 406, 408 can accept the SIP INVITE. It should be noted that communication between the super client and the sub-clients can be implemented using any suitable thin layer application protocol, for example. To further assist in the sub-client selection process (430), the super client 404 may instruct (426, 428) both the sub-client 406 and the sub-client 408 to acquire network resources, including resource capabilities, of their corresponding networks 410, 412. In this case, the super client 404 selects both the sub-client 406 and the sub-client 408 to handle different media streams for the session based on the session parameters and acquired network resources. The network resources acquired by the sub-clients 406 and 408 may include, but is not limited to, network availability, signal strength, bandwidth information, coverage, supported media type and format, data rate, or cost associated with each of the networks 410, 412.

In another implementation, the super client 404 has enough information regarding network parameters, characteristics, and capabilities (e.g., through the process of the sub-clients registering with their respective networks) to perform an initial sub-client selection (430) based on the session parameters included in the first SIP INVITE (424) that is received. The super client selects sub-clients to each handle a specific subset of media streams in the SIP INVITE and then directs the selected sub-clients to acquire network resources (426, 428) for the corresponding subset of media streams. Based upon the results of those acquired network resources, the super client 404 can direct the initially selected sub-clients to accept (422, 434) the SIP INVITE or can adjust its sub-client selection (430). For instance, based on the acquired network resources, the super client might direct only sub-client 406 to receive all or a subset of the media streams in the SIP INVITE or may direct some other sub-client (not shown) to accept all of a subset of the media streams in the SIP INVITE.

Once the super client 404 selects between the sub-client 406 and the sub-client 408, the super client 404 knows that the application server 414 supports simultaneous streaming of multiple streams of a single session between the multi-mode device 402 and the application server 414. So, the super client 404 instructs the sub-clients 406, 408 to send acknowledgements in response to the INVITEs (424) and (431) through the corresponding networks 410, 412 to the application server 414. As illustrated in FIG. 4, the sub-client 406 sends the acknowledgment using a partial 200OK message (432) to the application server 414 through the network 410, and the sub-client 408 sends the acknowledgment using a partial 200OK message (434) to the application server 414 through the network 412. In this case, the multiple streaming occurs through the networks 410, 412. In one example, the partial 200OK (432, 434) sent by sub-clients 406, 408 includes information related to media type supported by the corresponding networks 410, 412.

Figure 5:
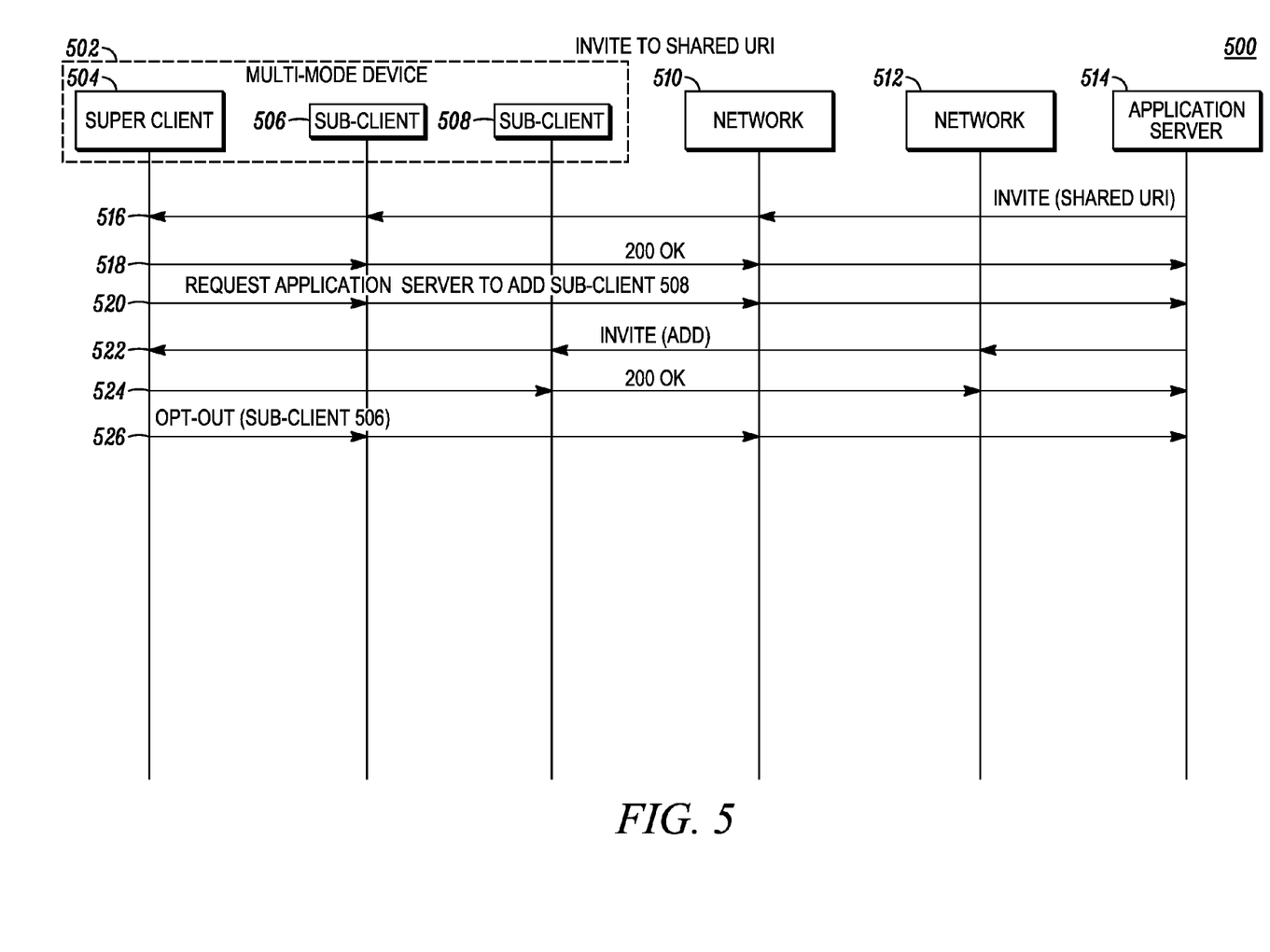
FIG. 5 is signal flow diagram in accordance with some embodiments.

In another implementation, shown in FIG. 5, is a multi-mode device 502, comprising: a super client 504, a sub-client 506, and a sub-client 508. Also illustrated are a network 510, a network 512, and an application server 514. Sub-clients 506, 508 register with their corresponding networks 510, 512 using techniques described above by reference to FIG. 4, with the description not repeated here for the sake of brevity. Operationally, when the super client 504 determines that the application server 514 does not support multiple streaming (e.g., via use of a partial 200OK), only one of the sub-clients (in this case sub-client 506) registers the shared URI with the application server 514. As illustrated by FIG. 5, the application server 514 sends an INVITE (516) using the shared URI to the sub-client 506 through network 510, which is forwarded to the super client 504.

As discussed above with respect to FIG. 4, the super client may determine that due to network resources and capabilities, it may be advantageous to having the sub-clients receive different media streams of the session via their respective networks. Accordingly, since the application server in this case does not support a partial 200 OK, the super client 504 instructs the sub-client 506 to send an acknowledgment in response to the INVITE (516) as a 200OK message (518) through its corresponding network 510 to the application server 514. After the session is established between the sub-client 506 and the application server 514, the super client 504 instructs sub-client 506 to send a request 520 to the application server 514 to add sub-client 508 to the session, in this case for a particular media stream. In response to the request, the application server 514 sends an INVITE message (522) to the sub-client 508, thereby adding the sub-client 508 to the session. The sub-client 508 then forwards the INVITE (522) to the super client 504. In response to receiving the INVITE (522), the super-client 504 instructs the sub-client 508 to send a 200 OK message (524) to the application server 514.

In one example, when the streaming for one of the sub-clients 506, 508 is complete, the super client 504 may instruct the sub-client to opt-out from the session. As illustrated in FIG. 5, the super client 504 instructs the sub-client 506 to send a message (526) to opt-out the sub-client 506 from the session.

Figure 6:
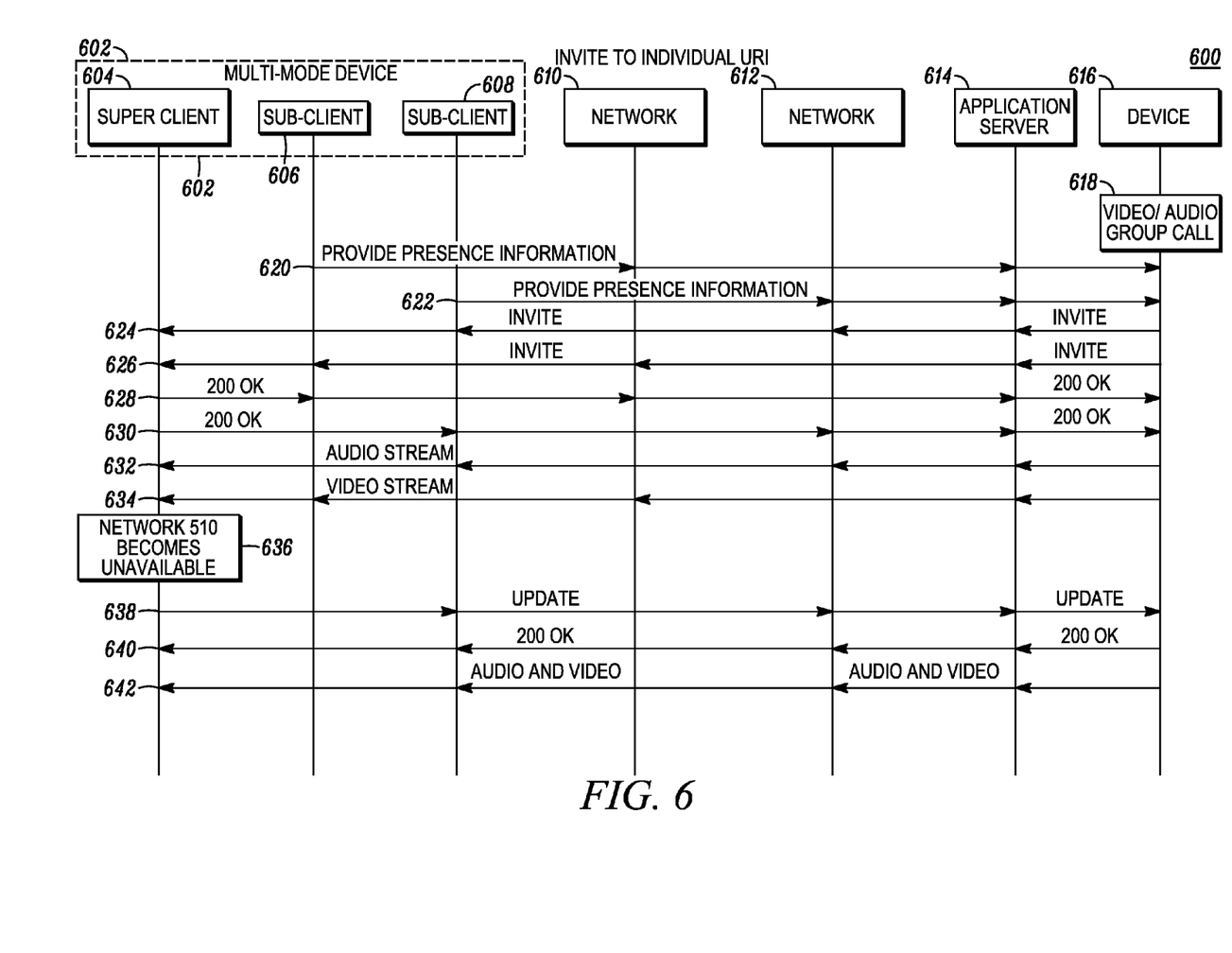
FIG. 6 is signal flow diagram in accordance with some embodiments.

Referring now to FIG. 6, a call flow diagram 600 illustrating operation of the system 100 in accordance with some embodiments is shown. Generally speaking, the call flow 600 is a specific approach for establishing a session followed by steps resulting in media streaming through multiple networks.

In the present embodiment, sub-clients 606, 608 are registered with their corresponding networks 610, 612 using techniques described above by reference to FIG. 4, with the description not repeated here for the sake of brevity. Further, sub-clients 506, 508 individually register with an application server 514 using at least their corresponding individual logical identities using techniques described above by reference to FIG. 4. The sub-clients 606, 608 provide presence information (620, 622) to the application server 614. The presence information may include, but is not limited to, the individual logical identity, user or individual logical identity availability, and resource capabilities of the corresponding networks, to name a few. The application server 614 upon receiving the presence information from the sub-clients 606, 608, can make the presence information available to other devices in the communication system 100, by any suitable means, for potential use by a device having capabilities to use such information. In one example, a device 616 receives the presence information of the sub-clients 606, 608 and uses this presence information to initiate a session with the sub-clients 606, 608. Also using conventional techniques, the device 616 may already be aware of at least the individual logical identities of the sub-clients.

In one example, as illustrated in FIG. 6, the device 616 initiates a session, for example a video and audio group call (618), with the sub-clients 606, 608 and based on the presence information decides to send separate audio and video streams to the sub-clients 606, 608. Accordingly, the device 616 sends an INVITE 624 (for audio) and an INVITE 626 (for video) to the application server. The application server 614 forwards the INVITE (624) to the sub-client 606 using the individual logical identity associated with the sub-client 506, and the INVITE (626) to the sub-client 608 using the individual logical identity associated with the sub-client 608. The INVITEs (624, 626) are then forwarded to the super client 604 by the respective sub-clients 606, 608. In response to receiving the INVITEs (624, 626), the super client 604 directs the sub-clients 606, 608 to respectively send 200OK messages (628, 630) to the application server 614. The application server 614 forwards the received 200OK messages (628, 630) to the device 616. In response to receiving the 200OK messages (628, 630), the device 616 streams different media, for example, an audio stream (632) and a video stream (634), of the same session to the sub-clients 606, 608 through the application server 614 and the networks 610, 612 corresponding to the sub-clients 606, 608.

The super client 604 receives the audio stream (632) through sub-client 608 and the video stream (634) through sub-client 606. The super client 604 combines the received audio stream (632) and the video stream (634), and further synchronizes the streams such that a user of the multi-mode device 602 views the synchronized audio and video streams.

In one example, the super client 604 periodically monitors the resource capabilities of the networks 610, 612. During this monitoring, the super client discovers that the network 610 has become unavailable (636). Accordingly, the super client 604 instructs the sub-client 608 to send an UPDATE (638) to the device 616 via the network 612 and the application server 614 to stop streaming video (634) to sub-client 606. In response to receiving the UPDATE (638), the device 616 sends a 200 OK message (640) to the application server 614. The application server 614 forwards the received 200 OK message (640) to the super client 604 via the network 612 and the sub-client 608. The video stream may then be added to the existing audio stream (642) via the network 612 to the sub-client 608. In the event of another network (not shown) providing better resource capabilities than the networks 610, 612 for video streaming, the super client 604 may instruct one of the sub-clients 606, 608 to register with the resource capable network without the session being disconnected with the application server 614. The super client can then (for example) request the device 616 to invite the newly registered sub-client to receive the video streaming.

Figure 7:
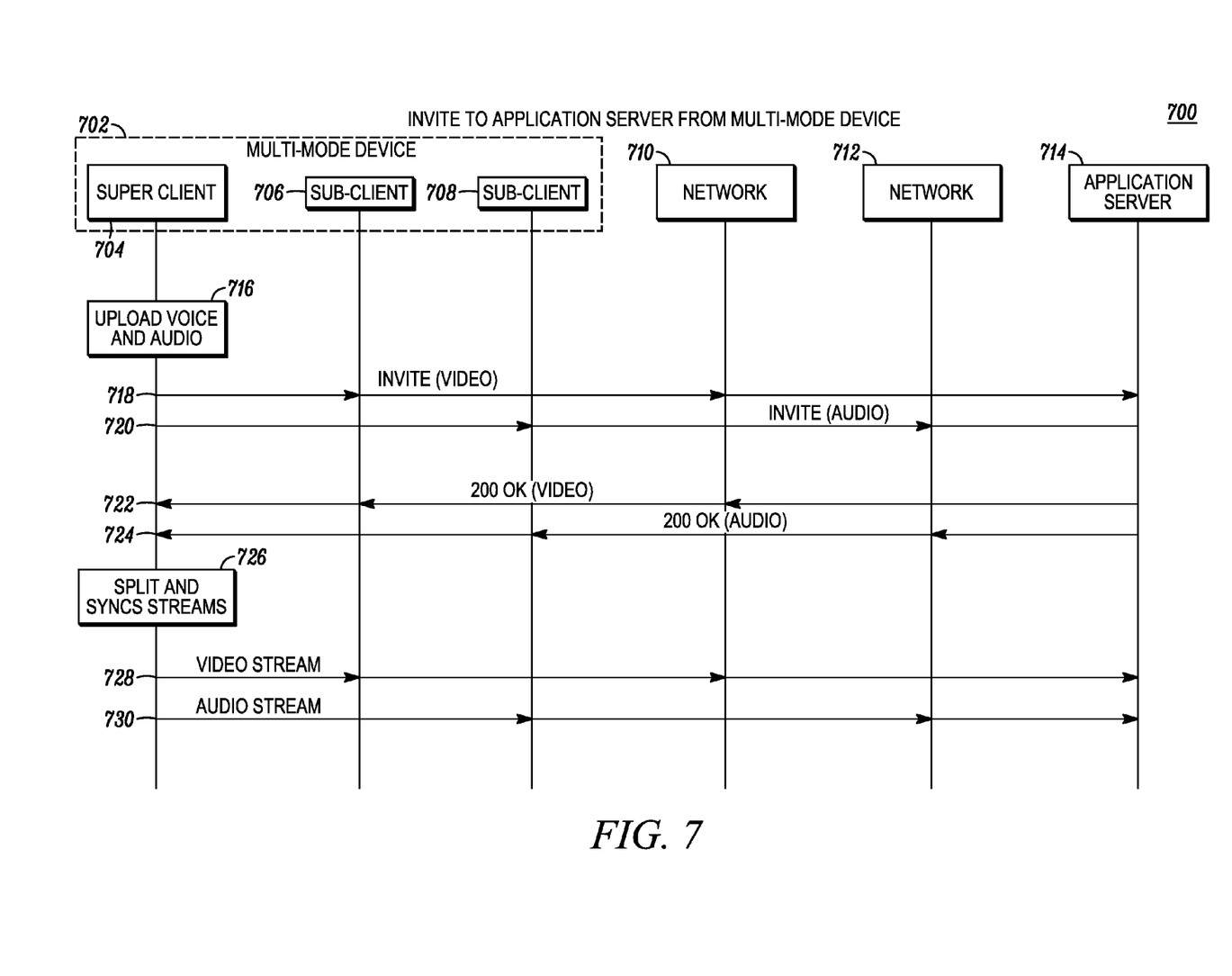
FIG. 7 is signal flow diagram in accordance with some embodiments.

Referring now to FIG. 7, a call flow diagram 700 illustrating operation of the system 100 in accordance with some embodiments is shown. Generally speaking, the call flow 700 is a specific approach for establishing a session followed by steps resulting in media streaming through multiple networks.

In the present embodiment, sub-clients 706, 708 are registered with their corresponding networks 710, 712 and with the application server using techniques described above by reference to FIG. 4, with the description not repeated here for the sake of brevity. Operationally, the sub-client 706 may transmit its registration details to network 710 and the sub-client 708 may transmit its registration details to network 712. Further, sub-clients 706, 708 may individually register with the application server 714 using the corresponding individual logical identities.

In this illustrative implementation, the super client 704 initiates (716) establishment of a session for uploading media, for example video and audio through sub-clients 704, 708 with the application server 714. In this case, the super client 704 instructs the sub-client 706 to send an INVITE (718) for video to the application server 714. The sub-client 706 forwards the INVITE (718) to the application server 714 through the network 710. Likewise, the super client 704 instructs the sub-client 708 to send an INVITE (720) for audio to the application server 714. The sub-client 708 forwards the INVITE (720) to the application server 714 through the network 712. In response to the INVITEs (718 and 720), the application server 714 sends a 200 OK (722) to the sub-client 706 through the network 710 and a 200 OK (724) to the sub-client 708 through the network 712, which are both forwarded to the super client. The super client then splits and synchronizes (726) the video and audio in order to stream them separately through different networks. Super client 704 uploads the video stream (728) via sub-client 706 and its corresponding network and uploads the audio stream (730) via sub-client 708 and its corresponding network.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for enabling a multi-mode device to establish a session through multiple networks in a communication system, the method comprising:

registering, at the same time, each of a plurality of sub-clients of a single multi-mode device with a single application server, wherein each sub-client is separately registered with the application server through a different network, using a different individual logical identity sent to the application server over a connection formed by a transceiver in the multi-mode device, wherein the individual logical identities are separate from physical contact addresses used on the networks, and the individual logical identities cause the sub-clients to register with the application server as different devices;

detecting an invitation including session parameters to establish a session using the single application server; and selecting at least one of the sub-clients to process the invitation based on the session parameters to establish the session through the networks corresponding to the selected sub-clients.

2. The method of claim 1 further comprising providing to the application server presence information for at least one of the sub-clients for making the presence information available to other devices in the communication system.

3. The method of claim 2, wherein the invitation is received from one of the other devices and is addressed to at least one of the individual logical identities based on the presence information.

4. The method of claim 1, wherein at least one of the sub-clients is also registered with the application server using a shared logical identity.

5. The method of claim 4, wherein the shared logical identity is associated with the individual logical identities for at least two of the plurality of sub-clients.

6. The method of claim 5, wherein an invitation is sent to each of the sub-clients having individual logical identities associated with the shared logical identity, the method further comprising, upon detecting receipt of the invitation received by a first one of the sub-clients, performing the selecting and directing at least one of the sub-clients having individual logical identities associated with the shared logical identity to acquire resource capabilities of its corresponding network.

7. The method of claim 6, wherein the resource capabilities include information related to at least one of network availability, signal strength, bandwidth information, coverage, supported media type and format, data rate, or cost associated with each of the networks.

8. The method of claim 4, wherein the invitation is addressed to the shared logical identity.

9. The method of claim 1, wherein the invitation is accepted by each selected sub-client using a partial 200 OK or a 200 OK.

10. The method of claim 8 further comprising:
directing the selected sub-clients to each receive a different media stream across its corresponding network.

11. The method of claim 10 further comprising:
instructing at least one of the selected sub-clients to opt out from receiving its media stream based on the resource capabilities of its corresponding network.

12. The method of claim 1 further comprising inviting the application server to the session for uploading media.

13. The method of claim 1, wherein at least two of the multiple networks are heterogeneous networks.

14. A multi-mode device comprising:
a single physical housing having housed therein:
at least one transceiver;
a processing device coupled to the transceiver and programmed to perform a method comprising:
registering, at the same time, each of a plurality of sub-clients of the single multi-mode device with a single application server, wherein each sub-client is separately registered with the application server through a different network, using a different individual logical identity sent to the application server over a connection formed by the at least one transceiver in the multi-mode device, wherein the individual logical identities are separate from physical contact addresses used on the networks, and the individual logical identities cause the sub-clients to register with the application server as different devices;
detecting an invitation including session parameters to establish a session using the single application server; and
selecting at least one of the sub-clients to process the invitation based on the session parameters to establish the session through the networks corresponding to the selected sub-clients.

15. The multi-mode device of claim 14, wherein the at least one transceiver comprises a separate physical transceiver for each of the plurality of sub-clients, and a separate physical antenna coupled to each of the separate transceivers.

16. A non-transitory computer-readable storage element having computer readable code stored thereon for programming a computer to perform a method for enabling a multi-mode device to establish a session through multiple networks in a communication system, the method comprising:
registering, at the same time, each of a plurality of sub-clients of a single multi-mode device with a single application server, wherein each sub-client is separately registered with the application server through a different network, using a different individual logical identity sent to the application server over a connection formed by a transceiver in the multi-mode device, wherein the individual logical identities are separate from physical contact addresses used on the networks, and the individual logical identities cause the sub-clients to register with the application server as different devices;
detecting an invitation including session parameters to establish a session using the single application server; and
selecting at least one of the sub-clients to process the invitation based on the session parameters to establish the session through the networks corresponding to the selected sub-clients.

* * * * *

UNITED STATES PATENT AND TRADEMARK OFFICE
CERTIFICATE OF CORRECTION

| | |
|---|---|
| PATENT NO. | : 8,131,858 B2 |
| APPLICATION NO. | : 12/062784 |
| DATED | : March 6, 2012 |
| INVENTOR(S) | : Agulnik et al. |

It is certified that error appears in the above-identified patent and that said Letters Patent is hereby corrected as shown below:

In Column 3, Line 6, delete "High-Speed Data Access (HSPA)," and insert -- High-Speed Data Packet Access (HSDPA), --, therefor.

Signed and Sealed this
Eighteenth Day of December, 2012

David J. Kappos
*Director of the United States Patent and Trademark Office*